(No Model.)
H. J. PAINE.
BALL COCK FOR WATER TANKS.
No. 580,709. Patented Apr. 13, 1897.
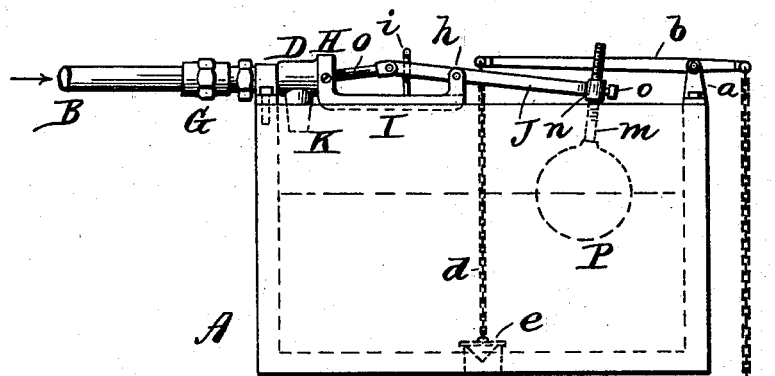
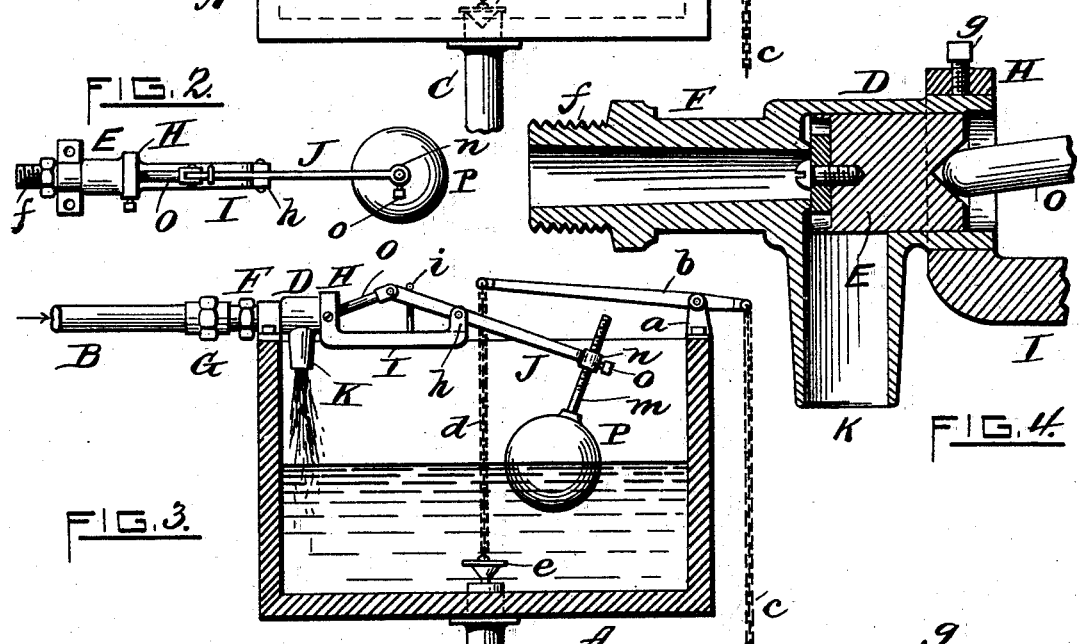
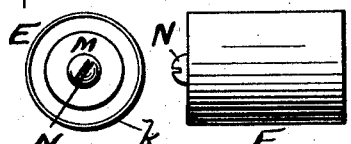
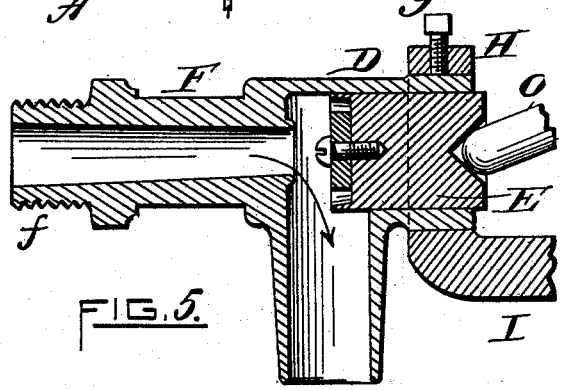
WITNESSES.
Alfred S. Johnson
Raymond S. Babcock
INVENTOR.
Henry J. Paine.
by Charles T. Hannigan
ATTY.

UNITED STATES PATENT OFFICE.

HENRY J. PAINE, OF PAWTUCKET, RHODE ISLAND.

BALL-COCK FOR WATER-TANKS.

SPECIFICATION forming part of Letters Patent No. 580,709, dated April 13, 1897.

Application filed December 2, 1896. Serial No. 614,230. (No model.)

*To all whom it may concern:*

Be it known that I, HENRY J. PAINE, of Pawtucket, in the county of Providence and State of Rhode Island, have invented certain new and useful Improvements in Ball-Cocks for Water-Tanks; and I declare the following to be a specification thereof, reference being had to the accompanying drawings.

Figure 1 is a side elevation of my invention as applied to a water-tank and is shown in the position of the parts when the tank is full. Fig. 2 is a top view of said device. Fig. 3 is a side elevation of my invention with the parts in position when the water is flowing into the tank. In this figure the tank is shown in central longitudinal section. Fig. 4 is a sectional view of the inlet-pipe with the valve seated to stop the flow of water. Fig. 5 is the same with the valve shown open. Figs. 6, 7, and 8 are respectively an end view, a side elevation, and a central longitudinal section of the valve.

Like letters indicate like parts.

My invention relates to valves used in connection with water-tanks to allow the flow of water in said tanks and to cut off said flow when desired.

It consists, in combination with a tank to contain water, of an inlet-pipe to supply said tank and a feed-pipe extending therefrom into the tank, a valve-seat in said pipes and a movable plug or valve therein, an extension from one of said pipes with a lever mounted thereon, a float or ball with a screw-threaded stem which is adjustably mounted at one end of said lever, and a rod pivotally mounted at its end to the opposite end of said lever and adapted to push said valve into its seat when the ball-float is elevated, as hereinafter particularly described.

A is a box-shaped tank to contain water.

B is a feed-pipe to conduct water from a reservoir or water-supply under pressure to said tank, and C is the waste-pipe from the tank.

On one edge of the tank A, upon a proper post or extension *a* thereof, a lever-arm *b* is pivotally mounted. The lever *b* is moved by the chain *c*, which extends down from the end of the same outside the tank A. A chain *d* at the opposite end of the lever *b* has a conical-shaped (or other) valve *e*, which is adapted to fill the upper end of the waste-pipe C, as in Fig. 1, or to be raised therefrom, as in Fig. 3.

A tubular pipe D serves to support the cylindrical plug or valve E. Said pipe D has a tubular extension F screw-threaded at its end, as at *f*, and by a union or coupling G the pipe B and tubular extension F are united to be continuous with each other.

By means of a collar H, which is secured upon the pipe D by a set-screw *g*, a bracket or arm I extends over the tank and has at its inner end a fulcrum-post *h*, upon which is pivotally mounted a lever J. A bent wire *i*, extending up from the bracket I, serves as a stop to limit the upward movement of the shorter arm of the lever J.

The feed-pipe K opens into the pipe D, and the water which enters through the pipe B flows through the tube F and is discharged into the tank A, as illustrated in Fig. 3.

The valve E is cylindrical and has at one end the central conical socket *j*. Its opposite end is cut out concentrically to form a recess, leaving flanges *k* on the edges. A washer M, of a less diameter than said recess, is secured to the valve E by the screw N, and the space between said washer M and the flange *k* forms an annular recess. A rod O is pivotally mounted, connected at one end with the end of the lever J, and the opposite end of said rod is rounded and inserted loosely in the conical recess or socket *j* of the valve E. A float or ball P has a screw-threaded stem *m*, which is engageable in a screw-threaded collar *n* at the end of the lever J and secured in any adjustable position thereon by the set-screw *o*.

The position of the parts of the device when the tank is full and the flow of water from the water-supply is cut off is shown in Figs. 1 and 4. In Fig. 1 it is seen that the ball P by its buoyancy elevates the end of the lever J, to which it is connected by the stem *m*. This causes the opposite end of the lever J to be depressed, and so the rod O crowds the valve E into its seat, Fig. 4, closing the tube F and pipe K and preventing the flow of water into the tank.

When it is desired to discharge the water from the tank, a pull on the chain *c* will operate the lever *b* and raise the valve *e* from the mouth of the waste-pipe C, thus allowing the water to flow out of the tank A through the waste-pipe C. As the water-level is lowered, as in Fig. 3, the ball or float P descends, bringing down the end of the lever J, to which it is attached by the stem $m$, and raising the opposite end of said lever as far as allowed by the bent end of the pin $i$ of the bracket I. This elevation of said end of the lever J draws the rod O and the water-pressure in the pipe B and tube F forces the valve E to move to the position shown in Fig. 5, still keeping in contact with the end of the rod O in the socket $j$. The water then flowing into the pipe fills the tank A, (as soon as the valve $e$ is returned to its former position to close the mouth of the waste-pipe C,) thus raising the ball P until it has been returned to the position shown in Fig. 1, whereupon the valve E, then in place, as in Fig. 4, shuts off the flow of water into the tank. The annular recess at the end of the valve E allows the water flowing through the tube F to get a better hold upon said valve to force it out of its seat.

By screw-threading the stem $m$ of the ball-float P and the collar $n$ of the lever J, I am able to adjust the ball and stem upon said lever so that the stem may extend any desired length below the lever, thus regulating the depth of water to be contained in the tank.

I claim as a novel and useful invention and desire to secure by Letters Patent—

The combination of a water-tank A, of a valve-casing D mounted thereon, provided with inlet-pipes F and K, with the cylindrical valve E to operate in said casing and provided with a central conical socket $j$ at one end, with an annular recess cut out concentrically at the opposite end, and further provided with a washer M of a less diameter than said recess, said washer secured to the valve E by the screw N, the bracket I fastened to the casing D, the lever J mounted on said bracket, the rod O pivotally connected with the lever J at one end thereof, and having its opposite end seated in the socket of the valve E, the adjustable ball-float P connected with the lever J.

HENRY J. PAINE.

Witnesses:
ALFRED S. JOHNSON,
HARMON S. BABCOCK.